US008332537B1

(12) United States Patent
Leonard et al.

(10) Patent No.: US 8,332,537 B1
(45) Date of Patent: Dec. 11, 2012

(54) ESTABLISHING A BYPASS CHANNEL BETWEEN QUEUE MANAGERS

(75) Inventors: Mark Leonard, Olathe, KS (US); Terriss L. Ford, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 299 days.

(21) Appl. No.: 12/818,470

(22) Filed: Jun. 18, 2010

(51) Int. Cl.
*G06F 15/173* (2006.01)
(52) U.S. Cl. ................................ 709/239; 709/206
(58) Field of Classification Search .......... 709/206, 709/239
See application file for complete search history.

(56) References Cited

U.S. PATENT DOCUMENTS

| | | | | |
|---|---|---|---|---|
| 6,496,516 | B1 * | 12/2002 | Dabecki et al. | 370/460 |
| 7,127,517 | B2 * | 10/2006 | Heisig et al. | 709/230 |
| 8,156,374 | B1 * | 4/2012 | Ford et al. | 714/15 |
| 2007/0112921 | A1 * | 5/2007 | Lunt et al. | 709/206 |
| 2010/0223491 | A1 * | 9/2010 | Ladd et al. | 714/2 |
| 2012/0096113 | A1 * | 4/2012 | Ladd et al. | 709/217 |

OTHER PUBLICATIONS

Saida Davis and Peter Broadhurst, Redbooks, WebSphere MQ V6 Fundamentals, IBM WebSphere.software, ibm.com/redbooks, 446 pages, First Edition (Nov. 2005). This IBM Redbook edition is an update to the Redpaper MQSeries Primer, REDP-0021. This edition applies to Version 6, Release O, Modification O, of IBM WebSphere MQ (product No. 5724-H72).

Ben Mann, Worldwide Product Manager, Providing a backbone for connectivity with SOA Messaging, IBM WebSphere.software, Service oriented architecture solutions, White paper, Updated: Jun. 2009, 32 pages, ibm.com/webspheremq, Copyright IBM Corporation 2009, Produced in the United States of America Mar. 2007.

* cited by examiner

*Primary Examiner* — Brian P Whipple

(57) ABSTRACT

A method, system, and medium are provided for establishing a bypass channel for communicating messages that would cause an error when they are communicated over their normal channel. The error may be caused by writing a message in an unexpected character set. Embodiments of the invention are practiced in a messaging-middleware environment. Channels are used to communicate messages between components associated with the messaging-middleware application.

20 Claims, 7 Drawing Sheets

ESTABLISHING A BYPASS CHANNEL BETWEEN QUEUE MANAGERS

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In a first illustrative aspect, a way of allowing a message written in a character set that a messaging-middleware environment is not configured to handle is allowed to be communicated through the messaging-middleware environment is provided. The way includes receiving an instruction to set up a bypass channel that communicates messages between a first queue manager and a second queue manager. An existing channel communicates messages between the first queue manager and the second queue manager. The way also includes establishing the bypass channel between the first queue manager and the second queue manager, wherein the bypass channel has a channel definition that is identical to the existing channel's definition except that a conversion attribute is set to an opposite setting. Additionally, a remote transmit queue that is managed by the first queue manager and is configured to transmit messages over the bypass channel is generated. In addition, one or more settings within the first queue manager are changed to route messages addressed to a transmit queue to the remote transmit queue, wherein the transmit queue is set up to communicate messages through the existing channel. A remote receiver queue that is managed by the second queue manager is generated and one or more settings within the second queue manager are changed to route messages received by the remote receiver queue to a receiver queue.

In another aspect, ways of establishing a bypass channel to communicate a message written in a character set that an existing channel is not configured to handle are provided. The ways include receiving, at a first queue manager, the message from a first application. The message is written to a transmit queue managed by the first queue manager. The message is addressed to a receiver queue managed by a second queue manager. The first queue manager and the second queue manager are communicatively connected by the existing channel that is configured to transmit messages between the transmit queue and the receiver queue. The message is communicated to a remote transmit queue that is managed by the first queue manager. The message is communicated from the remote transmit queue over the bypass channel to a remote receiver queue that is managed by the second queue manager.

In a third aspect, a way of allowing a message written in a character set that a messaging-middleware environment is not configured to handle to be communicated through the messaging-middleware environment is provided. The way includes receiving an indication that the message sent to a first queue manager is written in a character set that caused the message to not be delivered because of an incompatibility between the character set and existing settings within the messaging-middleware environment. The way also includes establishing a bypass channel to communicate messages between the first queue manager and a second queue manager. The bypass channel is based on an existing channel that communicates messages between the first queue manager and the second queue manager. The first queue manager and the second queue manager are within the messaging-middleware environment and manage one or more queues that handle the message. The bypass channel has the same characteristics as the existing channel except that a conversion attribute in the bypass channel is set to an opposite setting as the conversion attribute for the existing channel. The way includes generating a remote transmit queue that is managed by the first queue manager and is configured to transmit messages over the bypass channel. The way also includes changing one or more settings within the first queue manager to route messages addressed to a transmit queue to the remote transmit queue, wherein the transmit queue is set up to communicate messages through the existing channel. The way also includes generating a remote receiver queue managed by the second queue manager. The way also includes changing one or more settings within the second queue manager to route messages received by the remote receiver queue to a receiver queue.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention will be better understood from the detailed description provided below and from the accompanying drawings of various embodiments of the invention. Embodiments of the present invention allow a bypass channel to be established for communicating messages that would cause an error when they are communicated over their normal channel. The error may be caused by writing a message in an unexpected character set. Embodiments of the invention are practiced in a messaging-middleware environment. Channels are used to communicate messages between components associated with the messaging-middleware application. For example, channels communicate messages between a client application and a queue manager or between queue managers. An embodiment of the present invention automatically connects newly created receiving and sending queues with a bypass channel that has character conversion settings different from the primary channel on which the message would otherwise be communicated.

Embodiments of the present invention may take the form of a method, system, or computer-readable media with computer-executable instructions embodied thereon. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Figure 1:
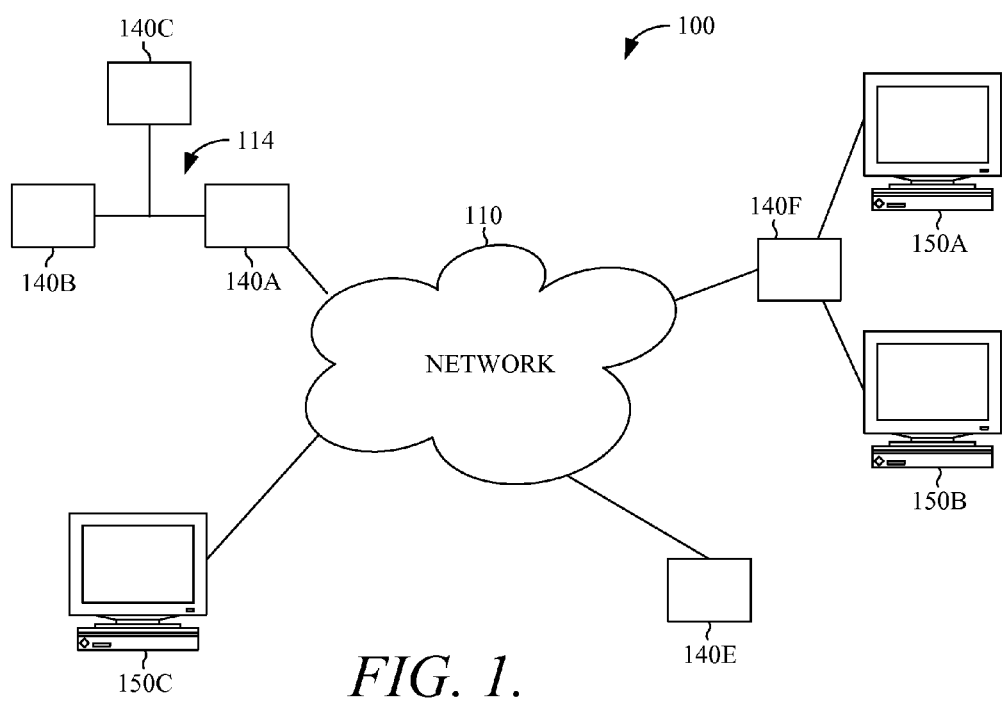
FIG. 1 is a drawing of an illustrative environment in which an embodiment of the present invention operates.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C, which communicate with each other via LAN 114, servers 140E and 140F, all of which communicate with each other via network 110. Operating environment 100 is merely an example of one suitable networking environment.

The client computing devices 150A, 150B, and 150C are configured for storing and/or processing computer-executable instructions and computer-readable data. The client computing devices 150A, 150B, and 150C can be a personal computer, desktop computer, laptop computer, handheld device, cellular phone, consumer electronic, digital phone, smartphone, PDA, or the like.

Network 110 might include a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 can comprise subsystems that transfer data between servers or computing devices. For example, network 110 may also include a point-to-point connection, the Internet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement embodiments of the present invention.

Operating environment 100 is merely exemplary. While the servers 140A-F are illustrated as single severs, they may be scalable. For example, the server 140C may, in actuality, include multiple servers in communication. The single server depictions are meant for clarity.

Figure 2:
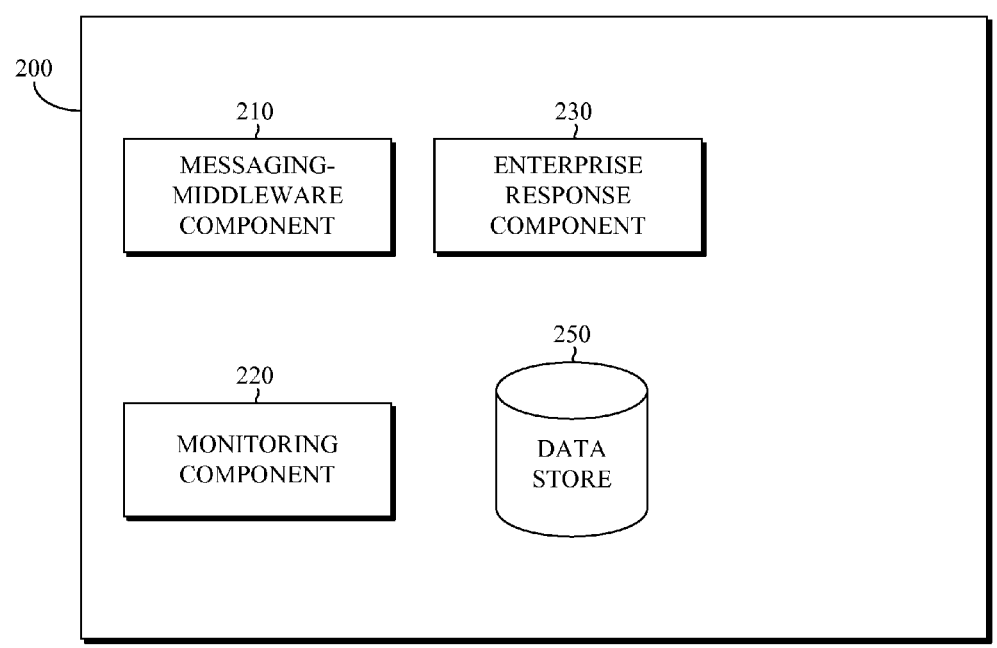
FIG. 2 is a drawing of an operating environment in which an embodiment of the present invention is practiced.

Turning now to FIG. 2, a block diagram depicts an exemplary computing-system architecture 200 suitable for converting messages to character sets suitable for a queue manager. The exemplary computing-system architecture 200 should not be interpreted as having any dependency or requirement related to any single component or combination of components illustrated therein.

Exemplary computing-system architecture 200 includes a messaging-middleware component 210, a monitoring component 220, an enterprise response component 230, and data store 250. Exemplary computing-system architecture 200 can reside in a single computing device. In the alternative, exemplary computing-system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging-middleware applications (a.k.a. message-oriented middleware) include IBM's WebSphere® MQ (formerly MQ Series®), Fiorano's MQ, Oracle Advanced Queuing (AQ), and Microsoft's MSMQ. For example, information from a front-end application is formed into one or more messages. These messages from the front-end application are placed in a sending queue within the messaging-middleware component 210 and transferred into a receiver queue within the messaging-middleware component 210. A back-end program retrieves the message from the receiving queue. The messaging-middleware component 210 uses queue managers to manage groups of queues. The message is transmitted through channels associated with the messaging-middleware component 210. In this example, the front-end program and the back-end program could be located on any computing device communicatively coupled to the one or more computers on which the messaging-middleware component 210 resides. A messaging-middleware client may reside on both of the computing devices on which the front-end and back-end programs reside to allow interaction with the messaging-middleware component 210.

The messaging-middleware component 210 may manage thousands of queues. In one embodiment, the messaging-middleware component 210 operates in parallel with secondary messaging-middleware components (not shown) containing additional instances of the queues managed by the messaging-middleware component 210. As described previously a queue transfers messages between two programs. Parallel queue instances transfer the same type of message between the same two programs, but are managed by separate messaging-middleware components.

The channels, queues, and queue manager settings within the messaging-middleware component 210 are described by a series of attributes. Each attribute has an associated value or setting. For example, one attribute could be a channel name and the associated setting could be "SprintBillinginfo1." Some attributes are preset, while other attributes measure current conditions within the channel and change over time. For example, the channel name attribute is preset, but the number of channels open on a queue manager changes based on the number of channels currently open.

Monitoring component 220 is configured to monitor messaging-middleware objects (e.g., channels and queues) for upset conditions that could require corrective actions. Examples of commercially available monitoring components include HP Openview®, Q Pasa!® by MQSoftware, Candle's PathWAI, and BMC Patrol. In one embodiment, the monitoring component 220 is able to retrieve, store, and evaluate channel information periodically to ascertain whether an upset condition is present. For example, the number of channels running on a queue manager could be retrieved. Having retrieved one or more attribute values, the monitoring component 220 evaluates one or more attribute values against threshold values within the monitoring component 220. The monitoring component 220 generates an alarm or incident message if attribute values are outside of normal operating conditions. The monitoring component 220 is able to perform one or more calculations with the one or more attribute values to arrive at a threshold. The monitoring component may also scan for message-delivery errors or other errors that indicate a problem has occurred.

The monitoring component 220 is also configured to generate and transmit notifications describing potential problems. A problem may be present when an error message or undelivered messages are identified. In one embodiment, the information about the potential problem is transmitted to enterprise response component 230. In another embodiment, the monitoring component 220 directly notifies a designated responder about the potential problem.

Enterprise response component 230 is configured to coordinate a response to a problem detected in a channel. The enterprise response component 230 receives information regarding a malfunction from a monitoring component 220 or another source. Upon receiving notification of a malfunction, the enterprise response component 230 may page a designated responder to investigate the upset condition. A designated responder can be an individual person or group of people given responsibility to fix upset conditions within certain channels. In another embodiment, the designated responder is a computer application that takes corrective actions. The enterprise response component 230 may help a designated responder trouble shoot by presenting one or more interfaces describing the problem. The interface may also provide tools that help the designated responder correct the problem. In one embodiment, the enterprise response component 230 activates a conversion utility when a queue manager receives a message written in a character set the queue manager is not configured to handle. In another embodiment, the conversion utility may be activated when the receiving application is unable to handle messages in the character set.

Figure 3:
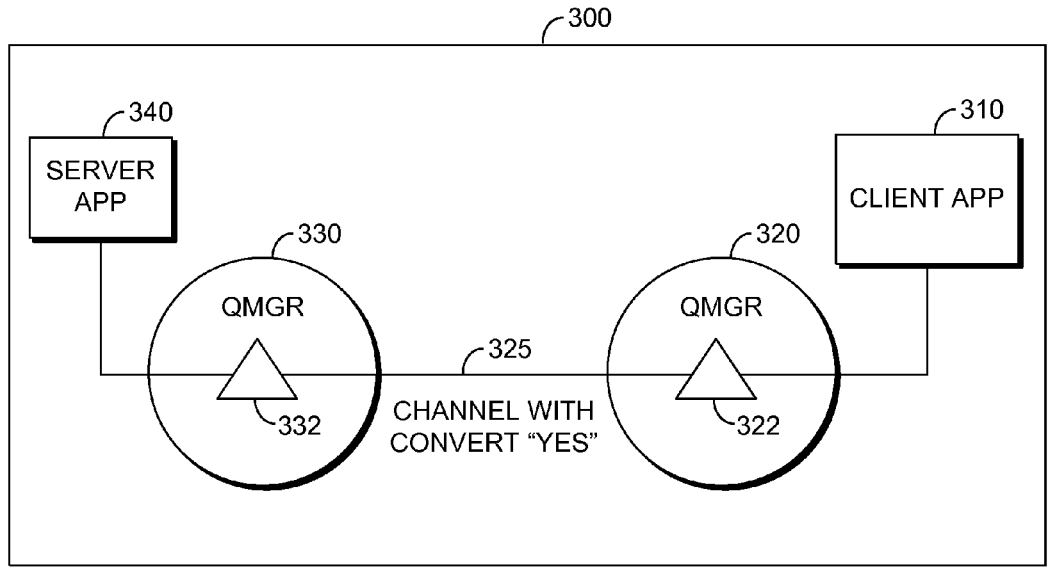
FIG. 3 is a diagram illustrating a block diagram illustrating objects and communication paths within a messaging-middleware environment, according to an embodiment of the present invention.

Turning now to FIG. 3, a block diagram illustrating objects and communication paths within a messaging-middleware environment 300 is shown, according to an embodiment of the present invention. The messaging-middleware environment 300 may be similar to the messaging-middleware component 210 described previously with reference to FIG. 2. The messaging-middleware environment 300 includes client application 310, queue manager 320, transmit queue 322, channel 325, queue manager 330, receiver queue 332, and server application 340. In one embodiment, messages are communicated from client application 310 to the queue manager 320. The queue manager 320 places the message in the transmit queue 322 that is managed by the queue manager 320. The queue manager 320 communicates the message from the transmit queue 322 over a channel 325. Queue manager 320 places the message in the receiver queue 332, which is managed by the queue manager 330. The server application 340 may retrieve the message from receiver queue 332. Queue managers 320 and 330 may both manage hundreds of queues.

The channel 325 is a logical channel. Queue managers and other entities within the messaging-middleware environment 300 use channels to communicate messages. An individual channel can have multiple instances. Multiple instances of the same channel have a common channel definition. Individual channel instances may communicate messages between the same or different endpoints. The channels may be unidirectional or bidirectional. Unidirectional channels may be set up in pairs to facilitate two-way communication between queue managers. In embodiments of the present invention, a pair of unidirectional channels may be referred to as a channel. The channels may be set up automatically by a message-channel agent or other component. Once established, a channel may be active for a designated period of time before it is terminated. Channels may have the capability to convert message character sets to a different character set in association with their transmission of the message.

As described previously, queue manager 320 and queue manager 330 may manage a large number of queues. The channel 325 may carry messages between multiple queues managed by queue manager 320 and multiple queues managed by queue manager 330. In one embodiment, all messages communicated between queue manager 330 and queue manager 320 are transmitted on the same channel 325. In another embodiment, multiple channels may be used to communicate messages between queue managers. Though only one server application 340 and one client application 310 are shown, in some embodiments, multiple applications may be writing messages to or reading messages from queues managed by a queue manager. A single queue manager may communicate with a group of applications.

Figure 4:
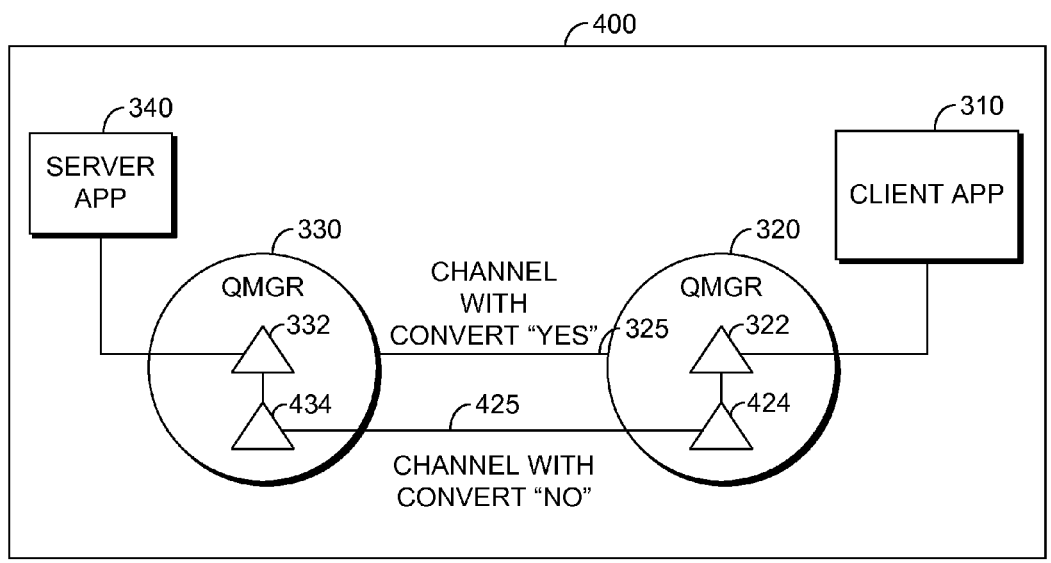
FIG. 4 is a diagram illustrating the routing of messages within a messaging-middleware environment after generation of a bypass channel, in accordance with an embodiment of the present invention.

Turning now to FIG. 4, a diagram illustrating the routing of messages within a messaging-middleware environment 400 after generation of a bypass channel 425 is shown, in accordance with an embodiment of the present invention. The client application 310, the queue manager 320, the transmit queue 322, the channel 325, the queue manager 330, the receiver queue 332, and the server application 340 have been described previously with reference to FIG. 3. Additionally, messaging-middleware environment 400 includes a remote transmit queue 424, a bypass channel 425, and a remote receiver channel 434.

The bypass channel 425 may be set up when the conversion function associated with channel 325 is not configured to convert messages received by a queue, or queue manager that is presently using the channel 325 to communicate the message. The bypass channel 425 is established with the conversion feature set to the opposite setting. In FIG. 4, the channel 325 has the conversion setting set to yes. Thus, the bypass channel 425 will have a conversion setting set to no. Accordingly, a message communicated over the bypass channel 425 will not be converted to a different character set. In one embodiment, messages are written in character set 1051 or 1208.

The bypass channel 425 is set up to communicate messages between the remote transmit queue 424 and the remote receiver queue 434. Messages received from the client application 310 in the transmit queue 322 are redirected to the remote transmit queue 424. In one embodiment, the messages are redirected using a queue alias. Similarly, messages received by the remote receiver queue 434 are communicated to the receiver queue 332. Again, a queue alias may be used to communicate messages or route messages from the remote receiver queue 434 to the receiver queue 332. A server application 340 may then retrieve the message from receiver queue 332.

Thus, the messaging-middleware environment 400 allows the queue managers 320 and 330 to communicate a message between a client application 310 and a server application 340 even when the message is written in a character set that the queue managers or channels are not configured to handle. In one embodiment, changes are made to the settings within the messaging-middleware environment 400 so that confirmation messages are not sent upon receipt of the message sent over the bypass channel 425. The generation of a confirmation message by a queue manager or application may require that the queue manager or application be able to handle the character set with which the message is written. If the queue manager can not handle a message's character set, the queue manager may not be able to generate a valid confirmation message. A communication error would occur if a confirmation message is required, but not received. Even though queue manager 330 or queue manager 320, or both, are not able to handle a message in the particular character set, the server application 340 may be able to handle the message. Eliminating the need to send a confirmation message allows the message to pass through the messaging-middleware environment 300 without creating an error.

Figure 5:
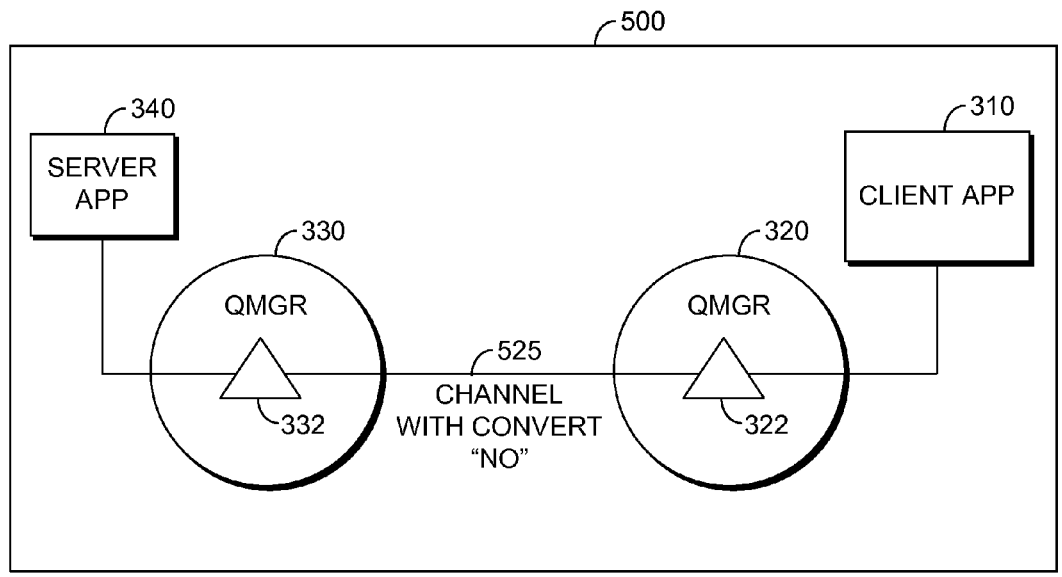
FIG. 5 is a diagram illustrating a block diagram illustrating objects and communication paths within a messaging-middleware environment, according to an embodiment of the present invention.
Figure 6:
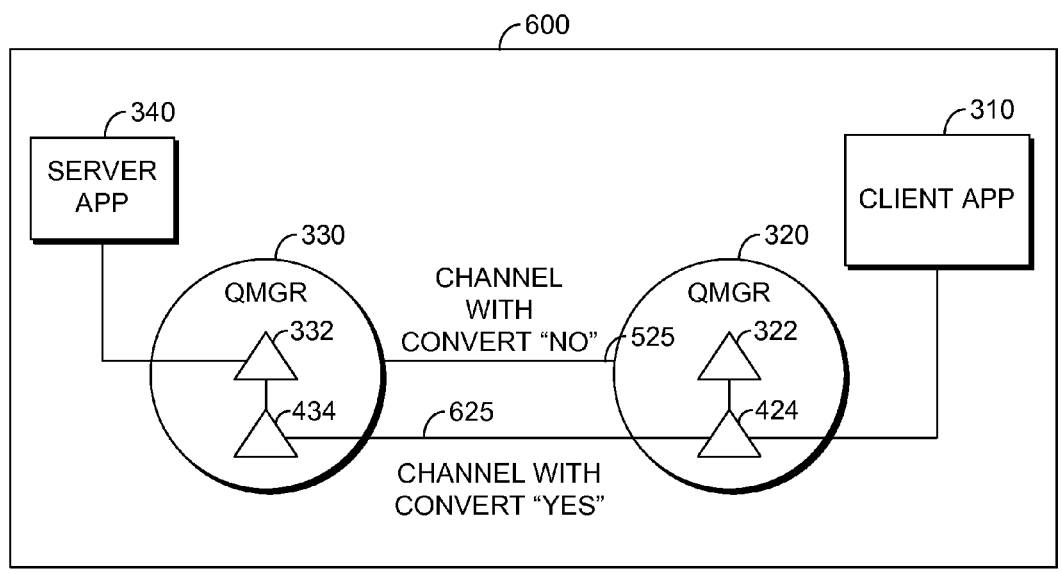
FIG. 6 is a diagram illustrating the routing of messages within a messaging-middleware environment after generation of a bypass channel, in accordance with an embodiment of the present invention.

Turning now to FIGS. 5 and 6, the routing of messages within messaging-middleware environments 500 and 600 are shown, in accordance with an embodiment of the present invention. Messaging-middleware environment 500 may be similar to messaging-middleware environment 300 described previously with reference to FIG. 3. One difference, is that the channel 525 has the convert attribute set to "no" rather than "yes." Thus, the channel 525 will not convert the message into a different character set as the message is communicated over the channel 525. In this embodiment, the bypass channel 625 is set up with a convert attribute set to yes. This means that messages communicated over the bypass channel 625 will be converted from the first character set to a second character set. The character set into which the message is converted may be based on the character set that the receiver queue 332 typically receives.

The embodiments illustrated in FIGS. 5 and 6 use a bypass channel 625 to avoid errors that would otherwise result from a message being received in an unexpected character set. In one embodiment, the queues and applications that communicate the message in FIGS. 5 and 6 are instructed not to send confirmation messages or expect confirmation messages to be sent. As described previously, eliminating a need for confirmation messages may reduce the probability of a communication error caused by receiving a confirmation message written in a character set that an entity within the messaging-middleware environment 600 is not configured to handle. In addition, an entity may be able to pass along a message in an unfamiliar character set without altering the message, but may not be able to generate a confirmation message for the message.

Figure 7:
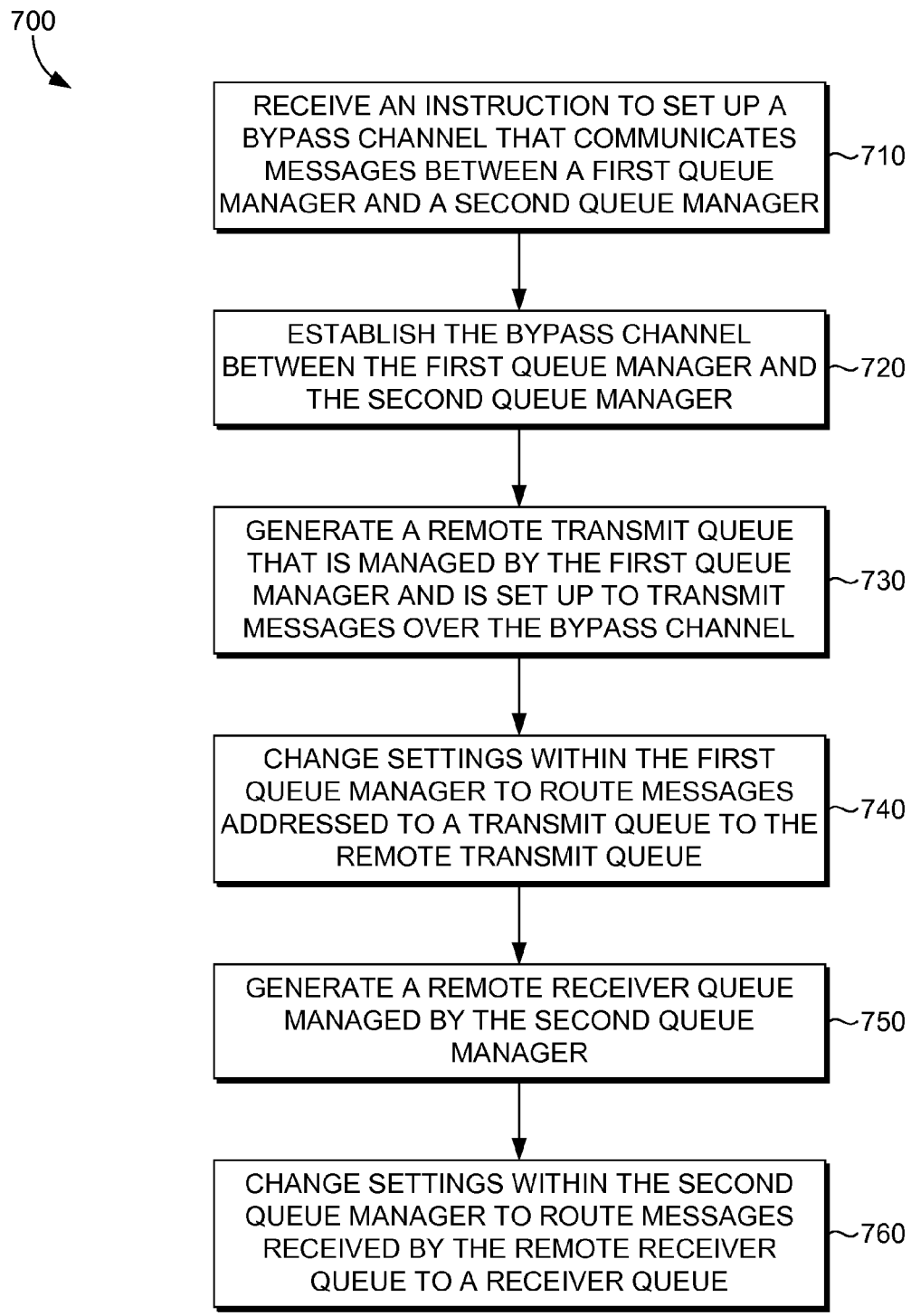
FIG. 7 is a flow diagram of a method that allows a message, which is written in a character set that a messaging-middleware environment is not configured to handle, to be communicated through the messaging-middleware environment, according to an embodiment of the present invention.

Turning now to FIG. 7, a flowchart illustrating a method 700 that allows a message, which is written in a character set that a messaging-middleware environment is not configured to handle, to be communicated through the messaging-middleware environment is shown, according to an embodiment of the present invention. The messaging-middleware environment may be similar to the messaging-middleware environments described previously. At step 710, an instruction to set up a bypass channel is received. The bypass channel communicates messages between a first queue manager and a second queue manager within the messaging-middleware environment. The bypass channel definition is based on an existing channel that communicates messages between the first and the second queue manager. The instruction may be generated upon discovering messages within the messaging-middleware environment that were not delivered. Undelivered messages may be stored in a dead-letter queue. The instruction may be generated after determining the message in the dead-letter queue was not delivered because of the character set in which the message was written.

At step 720, the bypass channel is established between the first queue manager and the second queue manager. The bypass channel has a channel definition that is identical to the existing channel's definition except that the conversion attribute is set to an opposite setting. In one embodiment, the conversion attribute for the existing channel is set to no and the conversion attribute for the bypass channel is set to yes. In another embodiment, the conversion attribute for the existing channel is set to yes and the conversion attribute for the bypass channel is set to no.

At step 730, a remote transmit queue, which is managed by the first queue manager is generated. The remote transmit queue is set up to transmit messages over the bypass channel. At step 740, settings within the first queue manager are changed to route messages addressed to a transmit queue to the remote transmit queue. The transmit queue is set up to communicate messages through the existing channel to a receiver queue managed by a second queue manager. In one embodiment, the existing channel handles all messages communicated between the first and the second queue manager.

At step 750, a remote receiver queue is generated. The remote receiver queue is managed by the second queue manager. At step 760, settings within the second queue manager are changed to route messages received by the remote receiver queue to the receiver queue. In this way, messages that would originally be sent between the transmit queue and the receiver queue over the existing channel are sent over the bypass channel using a remote transmit queue and a remote receiver queue. In one embodiment, objects such as the queue managers and queues and applications within the messaging-middleware environment are instructed not to send or expect to receive a delivery confirmation message.

Figure 8:
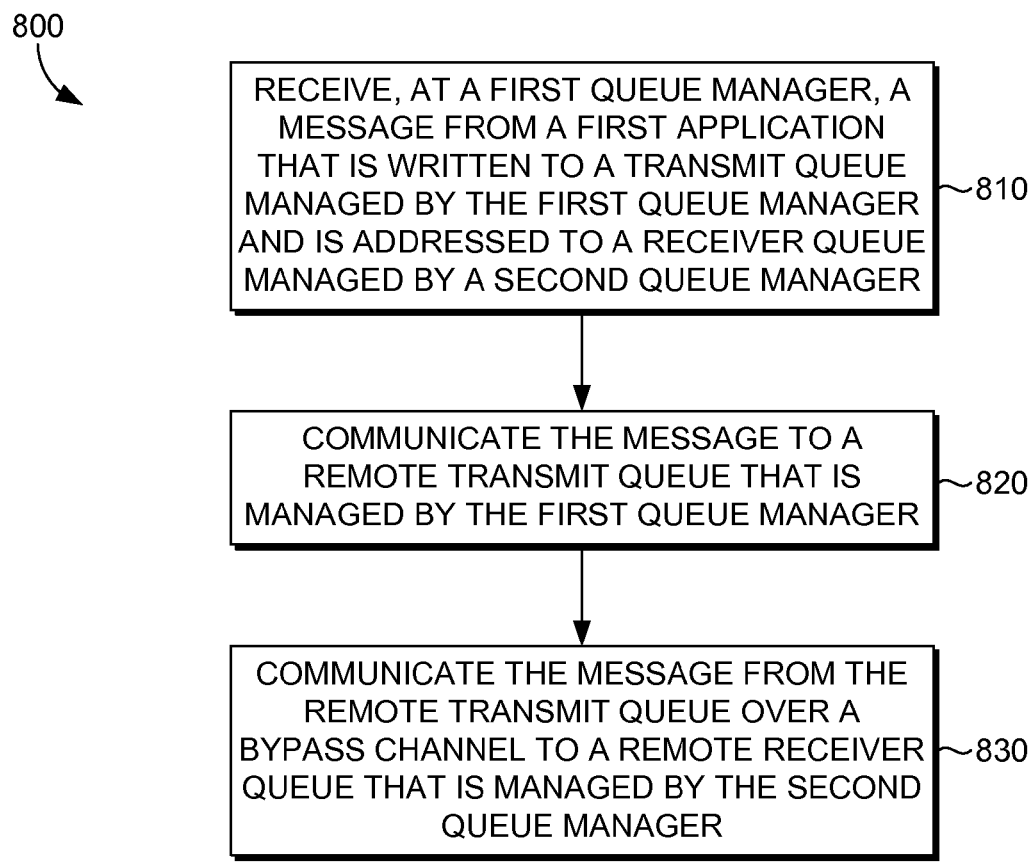
FIG. 8 is a flow diagram of a method of establishing a bypass channel to communicate a message written in a character set that an established channel is not configured to handle, according to an embodiment of the present invention.

Turning now to FIG. 8, a flowchart illustrating a method 800 of establishing a bypass channel to communicate a message written in a character set that an established channel is not configured to handle is shown, according to an embodiment of the present invention. The method may be performed in a messaging-middleware environment such as has been described previously. At step 810, a message is received from a first application at a first queue manager. The message is written to a transmit queue managed by the first queue manager. The message is addressed to a receiver queue managed by a second queue manager. The first queue manager and the second queue manager are communicatively connected by an existing channel that is configured to transmit messages between the transmit queue and the receiver queue. In one embodiment, the existing channel is configured to transmit all messages between the first queue manager and the second queue manager.

At step 820, the message is communicated to a remote transmit queue that is managed by the first queue manager. At step 830, the message is communicated from the remote transmit queue over a bypass channel to a remote receiver queue that is managed by the second queue manager. The message may then be transmitted from the remote receiver queue to the remote queue to which the message was originally addressed. The message may then be retrieved by another application from the remote receiver queue. In one embodiment, the queue managers and sending and receiving applications are instructed not to send or expect to receive delivery confirmation messages. In one embodiment, the existing queue is configured with a convert attribute set to yes. The bypass channel is configured to have a convert attribute set to the opposite setting, which in this embodiment would be no. In another embodiment, the existing channel has a convert attribute of no and the bypass channel has a convert attribute of yes.

Figure 9:
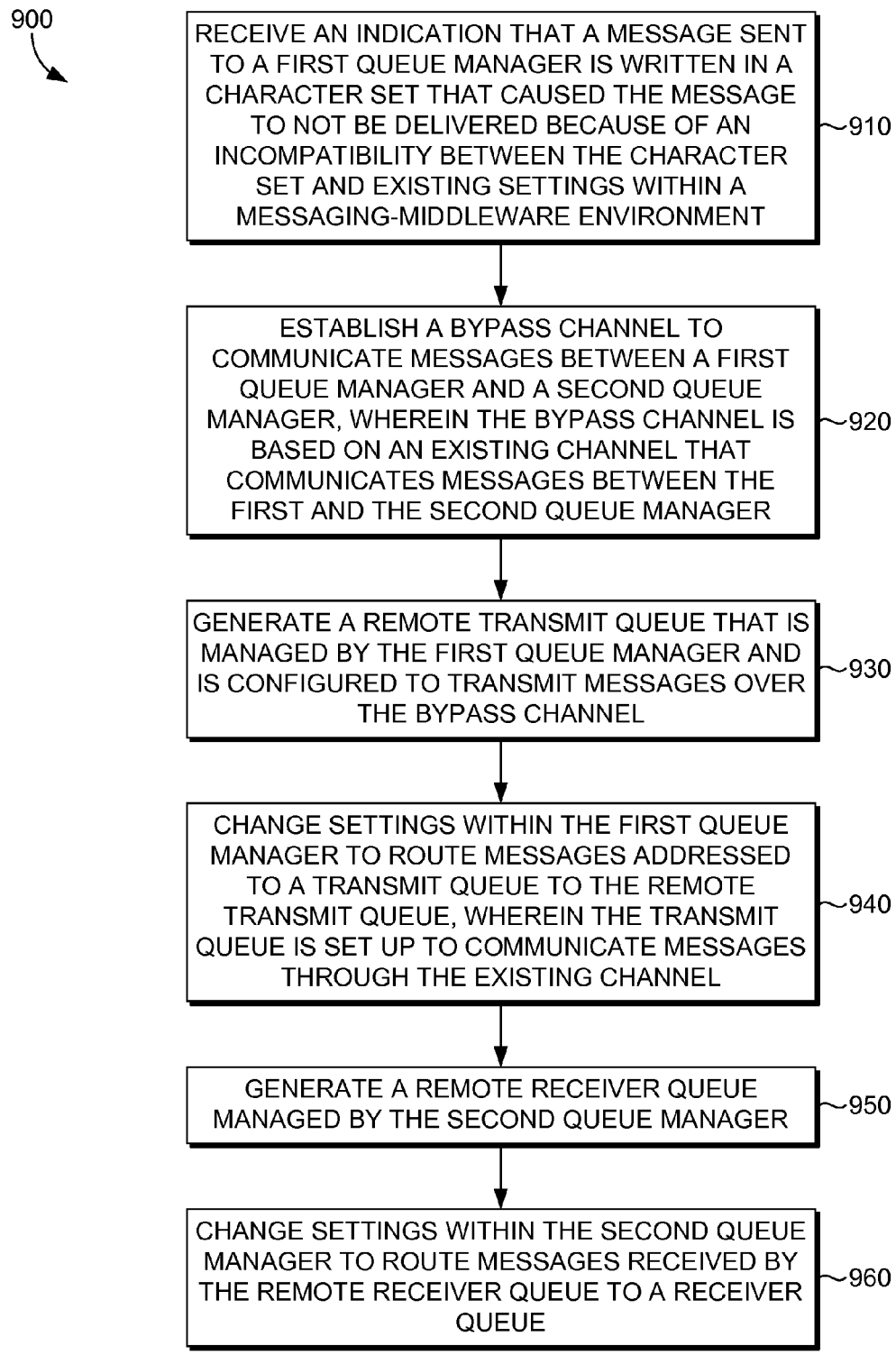
FIG. 9 is a flow diagram of a method that allows a message, which is written in a character set that a messaging-middleware environment is not configured to handle, to be communicated through the messaging-middleware environment, according to an embodiment of the present invention.

Turning now to FIG. 9, a flowchart illustrating a method 900 that allows a message, which is written in a character set that a messaging-middleware environment is not configured to handle, to be communicated through a messaging-middleware environment is shown, in accordance with an embodiment of the present invention. The messaging-middleware environment may be similar to a messaging-middleware environment described previously. At step 910, an indication is received that a message sent to a first queue manager is written in a character set that caused the message to not be delivered because of an incompatibility between the character set and existing settings within the messaging-middleware environment. In one environment the incompatibility is between a character set that a channel is configured to convert and the character set in which the message is written. In another embodiment, the incompatibility is between the character set the message is written in and the character set, or character sets, that the queues or queue managers within the messaging-middleware environment are configured to handle.

At step 920, a bypass channel is established to communicate messages between a first queue manager and a second queue manager. The bypass channel is based on an existing channel that communicates messages between the first queue manager and the second queue manager. The first queue manager and the second queue manager are within the messaging-middleware environment and manage one or more queues that handle the message. The bypass channel has the same characteristics as the existing channel except that a conversion attribute in the bypass channel is set to an opposite setting as the conversion attribute for the existing channel. Thus, if the conversion attribute in the existing channel is "no" then the conversion attribute in the bypass channel will be "yes."

At step 930, a remote transmit queue is generated. The remote transmit queue is managed by the first queue manager and is configured to transmit messages over the bypass channel. The remote transmit queue may receive messages from a transmit queue managed by the first queue manager. The message may be originally addressed in such a way that it would be handled by the transmit queue if it was not written in an incompatible character set. At step 940, settings within the first queue manager are changed to route messages addressed to the transmit queue to the remote transmit queue. The transmit queue is set up to communicate messages through the existing channel.

At step 950, a remote receiver queue managed by the second queue manager is generated. At step 960, settings within a second queue manager are changed to route messages received by the remote receiver queue to the receiver queue.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method that allows a message written in a character set that a messaging-middleware environment is not configured to handle to be communicated through the messaging-middleware environment, the method comprising:
   receiving an instruction to set up a bypass channel that communicates messages between a first queue manager and a second queue manager, wherein an existing channel communicates messages between the first queue manager and the second queue manager;
   establishing the bypass channel between the first queue manager and the second queue manager, wherein the bypass channel has a channel definition that is identical to the existing channel's definition except that a conversion attribute is set to an opposite setting;
   generating a remote transmit queue that is managed by the first queue manager and is configured to transmit messages over the bypass channel;
   changing one or more settings within the first queue manager to route messages addressed to a transmit queue to the remote transmit queue, wherein the transmit queue is set up to communicate messages through the existing channel;
   generating a remote receiver queue managed by the second queue manager; and
   changing one or more settings within the second queue manager to route messages received by the remote receiver queue to a receiver queue.

2. The method of claim 1, wherein the conversion attribute for the existing channel is configured to convert the message that is transmitted through the existing channel.

3. The method of claim 1, wherein the method further comprises instructing an application that communicates messages to the transmit queue not to expect a delivery confirmation for messages communicated to the transmit queue.

4. The method of claim 1, wherein the method further comprises instructing an application that receives messages from the receiver queue not to send a delivery confirmation message upon retrieving a message from the receiver queue.

5. The method of claim 1, wherein the existing channel communicates messages between multiple queues managed by the first queue manager and multiple queues managed by the second queue manager.

6. The method of claim 1, wherein the instruction is generated upon finding a previous message addressed to be sent from the transmit queue to the receiver queue in a dead-letter queue because the previous message was written in an incompatible character set.

7. The method of claim 6, wherein the method further comprises scanning the second queue manager's dead-letter queue and the first queue manager's dead-letter queue for undelivered messages that are written using one or more character sets that the messaging-middleware environment is not configured to handle.

8. One or more non-transitory computer-readable media having computer-executable instructions embodied thereon that when executed by a computing device perform a method of establishing a bypass channel to communicate a message written in a character set that an existing channel is not configured to handle, the method comprising:
  receiving an instruction to set up a bypass channel that communicates messages between a first queue manager and a second queue manager, wherein an existing channel communicates messages between the first queue manager and the second queue manager;
  establishing the bypass channel between the first queue manager and the second queue manager, wherein the bypass channel has a channel definition that is identical to the existing channel's definition except that a conversion attribute is set to an opposite setting;
  receiving, at the first queue manager, the message from a first application, wherein the message is written to a transmit queue managed by the first queue manager, wherein the message is addressed to a receiver queue managed by the second queue manager, and wherein the first queue manager and the second queue manager are communicatively connected by the existing channel that is configured to transmit messages between the transmit queue and the receiver queue;
  communicating the message to a remote transmit queue that is managed by the first queue manager; and
  communicating the message from the remote transmit queue over the bypass channel to a remote receiver queue that is managed by the second queue manager.

9. The media of claim 8, wherein a conversion attribute on the existing channel is set to "no" and the conversion attribute on the bypass channel is set to "yes."

10. The media of claim 8, wherein the message is written in a character set that the existing channel is not configured to convert.

11. The media of claim 8, wherein the method further comprises:
  communicating the message from the remote receiver queue to the receiver queue; and
  storing the message in the receiver queue until the message is retrieved by a second application.

12. The media of claim 11, wherein the second application does not communicate a delivery confirmation message.

13. The media of claim 8, wherein the message is routed from the transmit queue to the remote transmit queue using an alias.

14. The method of claim 8, wherein the message is written in a character set that the first queue manager is not configured to handle.

15. One or more non-transitory computer-readable media having computer-executable instructions embodied thereon for performing a method that allows a message written in a character set that a messaging-middleware environment is not configured to handle to be communicated through the messaging-middleware environment, the method comprising:
  receiving an indication that the message sent to a first queue manager is written in a character set that caused the message to not be delivered because of an incompatibility between the character set and existing settings within the messaging-middleware environment;
  establishing a bypass channel to communicate messages between the first queue manager and a second queue manager, wherein the bypass channel is based on an existing channel that communicates messages between the first queue manager and the second queue manager, wherein the first queue manager and the second queue manager are within the messaging-middleware environment and manage one or more queues that handle the message, and wherein the bypass channel has the same characteristics as the existing channel except that a conversion attribute in the bypass channel is set to an opposite setting as the conversion attribute for the existing channel;
  generating a remote transmit queue that is managed by the first queue manager and is configured to transmit messages over the bypass channel;
  changing one or more settings within the first queue manager to route messages addressed to a transmit queue to the remote transmit queue, wherein the transmit queue is set up to communicate messages through the existing channel;
  generating a remote receiver queue managed by the second queue manager; and
  changing one or more settings within the second queue manager to route messages received by the remote receiver queue to a receiver queue.

16. The media of claim 15, wherein the conversion attribute for the existing channel is configured to convert a message that is transmitted through the existing channel.

17. The media of claim 15, wherein the method further comprises instructing an application that sends messages to the transmit queue not to expect a delivery confirmation for messages sent to the transmit queue.

18. The media of claim 15, wherein the method further comprises instructing an application that receives messages from the receiver queue not to send a delivery confirmation message upon retrieving a message from the receiver queue.

19. The media of claim 15, wherein the method further comprises scanning the first queue manager's dead-letter queue for undelivered messages that are written using one or more character sets that the first queue manager is not configured to handle.

20. The media of claim 15, wherein the method further comprises scanning the second queue manager's dead-letter queue for undelivered messages that are written using one or more character sets that the second queue manager is not configured to handle.

* * * * *